US008693984B1

(12) United States Patent
Webb

(10) Patent No.: US 8,693,984 B1
(45) Date of Patent: Apr. 8, 2014

(54) CELLULAR VENDING APPARATUS, SYSTEMS, AND METHODS OF VENDING

(71) Applicant: Ronald Michael Webb, Elk Mound, WI (US)

(72) Inventor: Ronald Michael Webb, Elk Mound, WI (US)

(73) Assignee: U-Fuel, Inc., Las Vegas, NV (US)

( * ) Notice: Subject to any disclaimer, the term of this patent is extended or adjusted under 35 U.S.C. 154(b) by 0 days.

(21) Appl. No.: 13/795,929

(22) Filed: Mar. 12, 2013

Related U.S. Application Data

(63) Continuation-in-part of application No. 13/691,323, filed on Nov. 30, 2012.

(51) Int. Cl.
*H04M 11/00* (2006.01)

(52) U.S. Cl.
USPC .................. 455/406; 455/456.3; 705/14.38

(58) Field of Classification Search
USPC ........ 455/66.1, 406, 456.3, 552.1; 705/14.38, 705/14.53, 14.65, 27.1, 43
See application file for complete search history.

(56) References Cited

U.S. PATENT DOCUMENTS

| | | | |
|---|---|---|---|
| 6,360,141 B1 | 3/2002 | Jensen | |
| 6,584,309 B1 | 6/2003 | Whigham | |
| 7,039,389 B2* | 5/2006 | Johnson, Jr. | 455/406 |
| 2003/0158891 A1* | 8/2003 | Lei et al. | 709/203 |
| 2006/0224470 A1* | 10/2006 | Garcia Ruano et al. | 705/27 |
| 2008/0235105 A1* | 9/2008 | Payne et al. | 705/26 |
| 2010/0332389 A1* | 12/2010 | Al-Sahli | 705/43 |
| 2012/0253974 A1* | 10/2012 | Haikonen et al. | 705/26.41 |
| 2013/0006776 A1* | 1/2013 | Miller et al. | 705/14.65 |

FOREIGN PATENT DOCUMENTS

EP  1 168 257  2/2002

* cited by examiner

*Primary Examiner* — Ping Hsieh
(74) *Attorney, Agent, or Firm* — Anthony J. Bourget

(57) ABSTRACT

A dispenser having a unique cellular telephone calling number (or multiple unique calling numbers) operable in response to receiving a cellular message. The dispenser includes a cellular phone component and may include a SIM card slot and SIM card. A number of dispensers may each be equipped with a cellular phone component each having a unique calling number and a cellular phone system provider configured to authorize sending of information representing a pre-authorized amount of items to be dispensed as a wireless cellular signal to one or any of the dispensers. A cell pod is configured to enable a cellular telephone to communicate and control a vending machine. A method of selling items includes sending a cellular telephone signal to a unique telephone number associated with the dispenser and assessing a charge to the cellular telephone of a user prior to authorizing the sending of the signal.

28 Claims, 8 Drawing Sheets

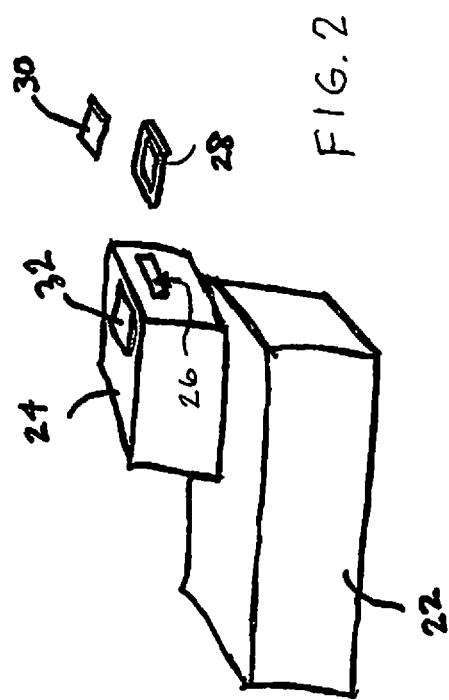
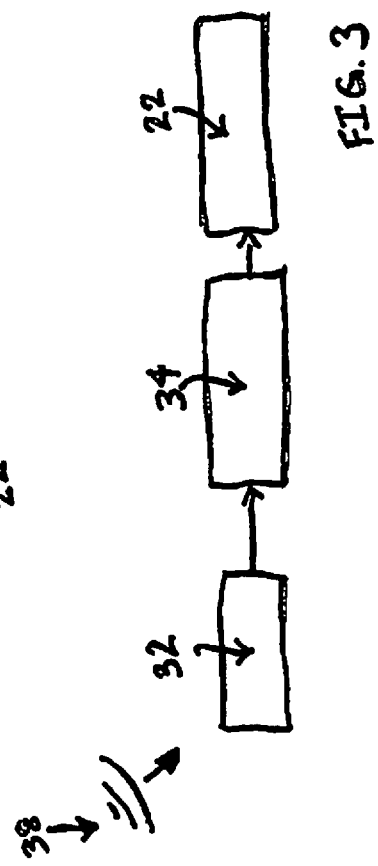

CELLULAR VENDING APPARATUS, SYSTEMS, AND METHODS OF VENDING

The present application is a continuation-in-part of, and claims priority to, co-pending U.S. patent application Ser. No. 13/691,323, filed on Nov. 30, 2012, which is hereby incorporated by reference as if fully reproduced herein.

BACKGROUND OF THE INVENTION

1. Field of the Invention

The present invention relates to a vending machine or vending service facility that receives communication for dispensing operations.

2. Background Information

There have been vending machines and systems that do not require the installation or use of card reading units for the dispensing of products. Vending machines may be operated by depositing coins or paper currency within the machine to receive a product. One system that does not require the installation or use of card reading units for dispensing fuel is shown in U.S. Pat. No. 6,360,141 to Jensen. The patent to Jensen shows a system that has aspects activated by wireless signals transmitted from a mobile telephone. Another system that relates to the purchase of a product from an automatic vending machine by using a cellular telephone is shown in U.S. Pat. No. 6,584,309 to Whigham. While the Jensen and Whigham systems may have useful features, there is room for improvement.

PARTIAL SUMMARY OF THE INVENTION

Although vending systems that include features operable via wireless telephone signals are known, the inventor has realized deficiencies with such systems and has developed improvements thereon. For example, in the vending of fuel or other items, the pump or dispenser shown herein includes a cellular phone component which allows the pump or dispenser to possess a unique calling number that may be accessed or controlled by a cellular telephone signal. The cellular phone component is electrically connected to the circuitry of a pump or dispenser. This provides ease of use for fuel or product dispensing and substantially reduces the costs of establishing such a system. Users can conveniently pay for fuel, and a fuel pump or station can more readily provide fuel given the lower cost of equipment, operation and administration. A method of facilitating the purchase of fuel includes assessing a charge to the cellular telephone (for instance by debiting pre-paid minutes, reducing credit, billing a user or the like) and authorizing the sending of a cellular telephone signal to a unique telephone number associated with the fuel pump which will dispense the requested value/volume of fuel. Assessing a charge by use of the telephone or an account associated with a telephone provides easier access for consumers while easing payment collection (and collection of services fees) by a provider.

Aspects of the invention include use of a cellular phone component in conjunction with a vending machine or vending system for dispensing products other than fuel. The vending machine may dispense a variety of products, including but not limited to the vending of food items, soft drinks, games and prizes, medicines, toys, tools, movies, tickets, DVDs, electronic goods, consumer products or any other items that are deliverable through a vending machine.

In many instances a vending machine may be equipped with a controller that communicates with and/or controls dispensing components or systems. A controller receives a signal request to dispense an item and undertakes control of the mechanisms used for the dispensing. In one aspect the vending machine and controller are configured to dispense food, snack, or beverages. In other aspects the vending machine and controller are configured to dispense fuel or other products.

In accordance with an aspect of the invention, an improved vending machine comprises a traditional vending machine having a controller where the controller is equipped with a cellular telephone component and having a unique cellular telephone calling number. In further aspects the component includes a SIM card slot and/or SIM card. In further aspects the component includes a cell phone interface configured to convert cellular telephone electrical signals into vending machine dispensing electrical signals.

In accordance with an aspect of the invention a cell pod is provided which is configured to communicate with both a standard cellular telephone and a standard vending machine. The cell pod includes circuitry and/or programming or software to transform a cellular telephone signal or message into a vending machine signal. When a user desires to purchase a vending item, a cellular signal is generated and received by the cellular telephone (or component of a cellular telephone) that is associated with the vending machine. Typically the cellular telephone will be connected to or within the vending machine. The cellular signal is then received by the cell pod and converted into a signal that is passed to the vending machine. The vending machine dispenses the goods that were requested. The cell pod is configured to respond back to the cellular telephone, which may result in a message such as a text message being sent back to the telephone company.

In accordance with an aspect of the invention, an improved fuel pump comprises a traditional pump having a controller where the controller is equipped with a cellular telephone component and having a unique cellular telephone calling number. In further aspects the component includes a SIM card slot and/or SIM card. In further aspects the component includes a cell phone interface configured to convert cellular telephone electrical signals into fuel pump electrical signals.

In a systems aspect, a cellular phone system provider is configured to authorize the sending of information representing a pre-authorized amount of items or fuel to be dispensed as a wireless cellular signal to a vending machine or fuel pump having a cellular phone component connected to the vending machine or pump controller, the phone component having a unique calling number configured to receive the wireless cellular signal.

In a method aspect, purchase of items or fuel is facilitated by assessing a charge to a cellular telephone in an amount representing a value/volume of items or fuel to be dispensed and authorizing the sending of a cellular telephone signal to a unique telephone number associated with the vending machine or fuel pump. The vending machine or fuel pump is equipped with a cellular phone component capable of receiving cellular control signals.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 2 is a perspective view of exemplary components of the dispenser of FIG. 1.

FIG. 3 illustrates a schematic view of further exemplary components of the dispenser of FIG. 1.

Figure 1:
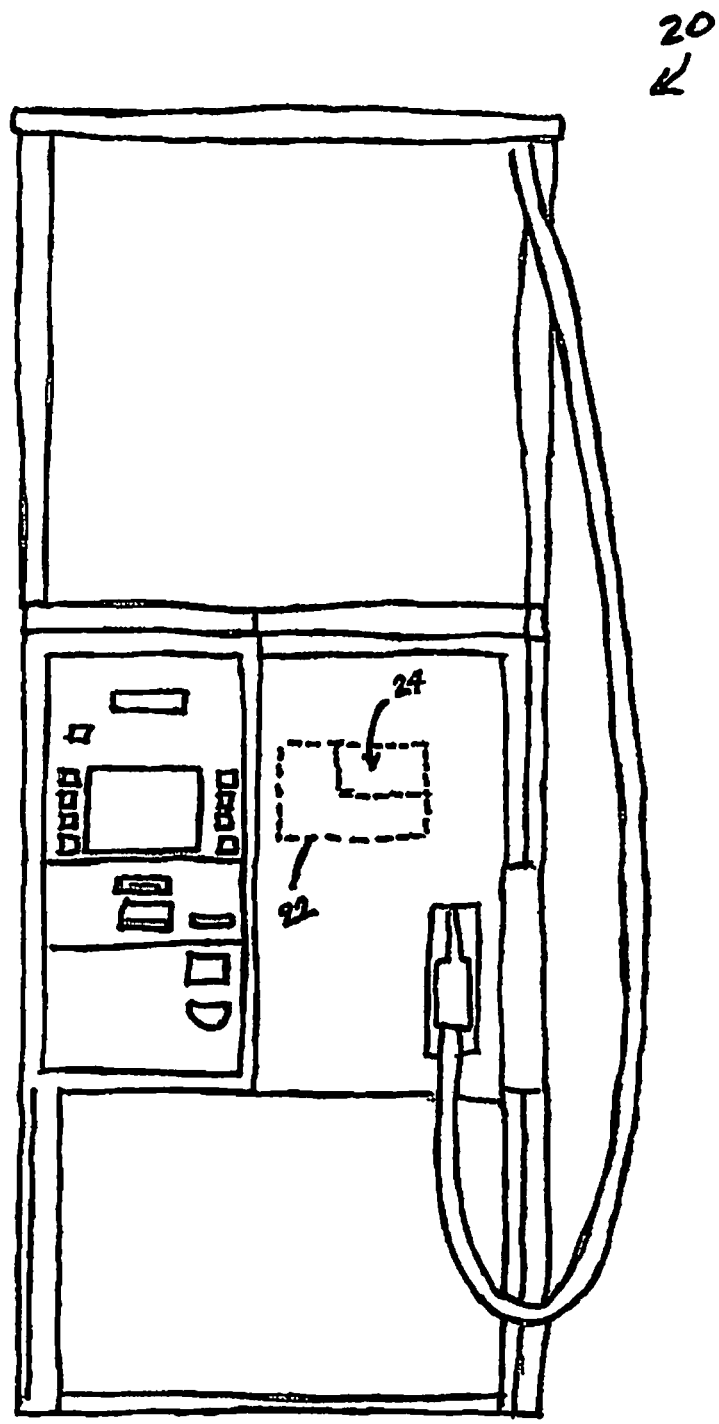
FIG. 1 illustrates an elevation view of an exemplary dispenser in accordance with an aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-12, aspects of the dispenser, system, and methods of dispensing are shown. FIG. 1 shows dispenser 20 (which in one example may be a fuel pump 20) which may be used to dispense fuel such as gasoline, diesel or other fuel. Dispenser or pump 20 or variations thereof may also be used to pump a variety of fuels, such as aviation fuel, propane, or other fuels as desired. Dispenser, such as dispenser 21 (See FIG. 9, for instance), may also be used to dispense other goods, including food items, games, prizes, toys, tickets, service vouchers, reservations, movies, DVDs, electronic goods, consumer products or any other items that are deliverable through a vending machine. It may be appreciated that a variety of types of dispensers 20 may be used in conjunction with the present invention. References herein to fuel pump 20, which is a dispenser, also apply to dispensers of different varieties, such as to dispenser 21 and other similar dispensers of goods. It may be appreciated that a standard, "off-the-shelf" type of dispenser or vending machine may be used. A standard dispenser or vending machine may be retro-fitted for use as provided herein.

Fuel pump 20 includes a controller 22 which is used to control the workings of pump 20 for dispensing. For example, controller 22 interacts with meters, sensors, and solenoid valves to determine the meter flow measurements associated with meters and other equipment traditionally used in pumping operations. The meters, solenoid valves and sensors are contained electronically within the pump and typically connected to piping that leads from a fuel storage tank 50 to a pump hose. Pump 20 includes a pump to transport fuel. Fuel is delivered to a hose and through a nozzle and into a customer's vehicle, motorcycle, moped, boat, airplane or other fuel consuming machine, device or receptacle. Controller 22 may interface with payment systems to receive payment information for transaction processing. For instance, controller 22 may interface with traditional keypads, magnetic strip card readers/scanners for insertion of credit, debit or other magnetic strip cards for payment, or with other transaction processing equipment. Several of such payments systems, however, are expensive and are not practical for use in every case.

As shown for example in FIG. 2, a cellular phone component 24 is connected to controller 22. Component 24 is electrically connected to controller 22. Component 24 may be contained within controller 22 or may be appended or connected to controller 22. Component 24 may be integrated with the circuitry of controller 22 and may include elements that share the same circuit board or other elements. Cellular phone component 24 exhibits or possesses a unique calling number. In one example, cellular phone component 24 includes features of the GSM (Global System for Mobile Communications) type and may be compatible for receiving/sending signals associated with the GSM cellular network. In one instance, component 24 may include a cellular telephone of GSM compatibility connected to controller 22. Additional or different digital cellular technologies may also be used. While component 24 need not comprise an entire cellular telephone (i.e., component 24 need not contain keys and/or speaker and/or camera or other features), use of a cellular telephone or smart phone as component 24 is not precluded. Component 24 may comprise a cellular telephone. Applicant appreciates that not all parts of a cellular telephone may be required for operation herein, and thus particular components of a traditional cellular telephone may be lacking from component 24.

In one aspect component 24 is electrically connected directly to controller 22 by securing an electrical wire from the circuitry of component 24 to the circuitry of controller 22. In a further instance, component 24 may be positioned on the same circuitry or circuit board as controller 22. In a further instance, component 24 may include an electrical plug to insert into a companion plug associated with controller 22 to maintain electrical connection therebetween. In this manner component 24 may be easily removed/replaced from controller 22. In further aspects a component 24 may be retrofitted into or onto a pre-existing controller 22. In yet further aspects controller 22 may be retrofitted to receive component 24. Controller 22 may also be configured to contain all elements of component 24.

In one aspect component 24 includes a SIM card slot 26. Slot 26 is configured to receive a SIM card 30. In one aspect SIM card 30 may be placed on a SIM card tray 28 and inserted into slot 26. As may be appreciated SIM card 30, i.e., a Subscriber Identity Module card, is a small removable smart card that is used in many cellular telephones to store data such as a customer's or telephone's unique mobile phone number, the mobile phone company used by the customer (i.e. ATT, Verizon, etc.), address book information, among other data. SIM card 30 may be removed and replaced with a different SIM card 30 to effectively change the unique calling telephone number of component 24. In this manner, fuel pump 20 and component 24 may be used in a variety of different countries and still be compatible for use in operation. Particularly, a SIM card 30 that is configured for use in the United States (or other country) for example may be removed and replaced with a SIM card 30 that is operational in, for instance, Indonesia (or other country) for example, without having to reconfigure the circuitry of component 24 or controller 22. It may be appreciated, however, that such circuitry may be hard-wired and/or programmed, if desired, to operate with a single non-changeable calling number.

Figure 5:
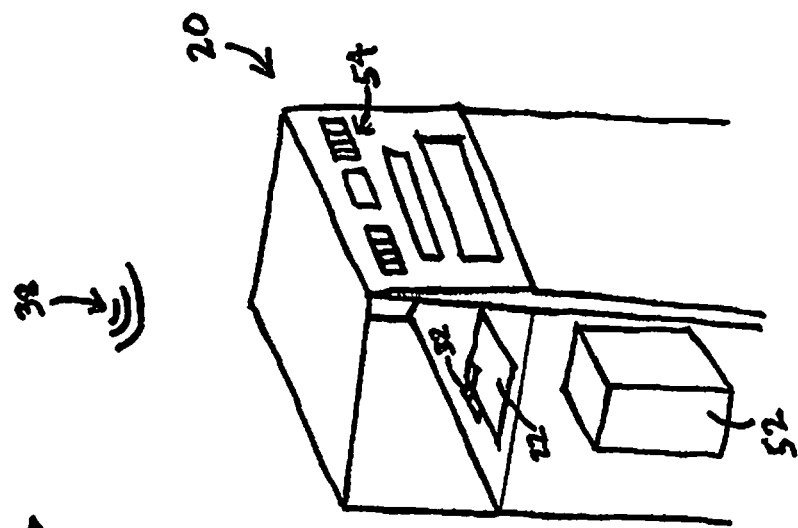
FIG. 5 is a partial perspective view of an exemplary dispenser in accordance with features of the invention.
Figure 6:
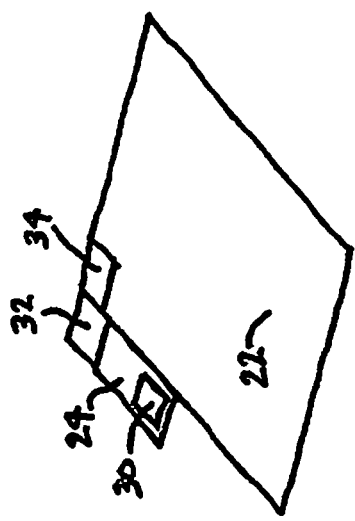
FIG. 6 is a perspective view of an exemplary component in accordance with feature of the invention.
Figure 7:
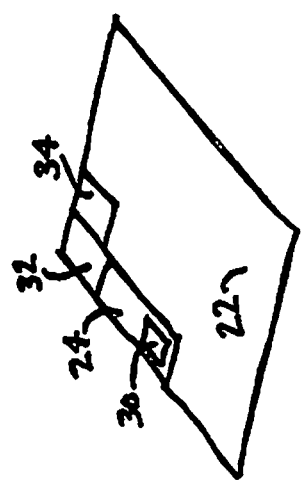
FIG. 7 is a perspective view of an exemplary component in accordance with features of the invention.
Figure 8:
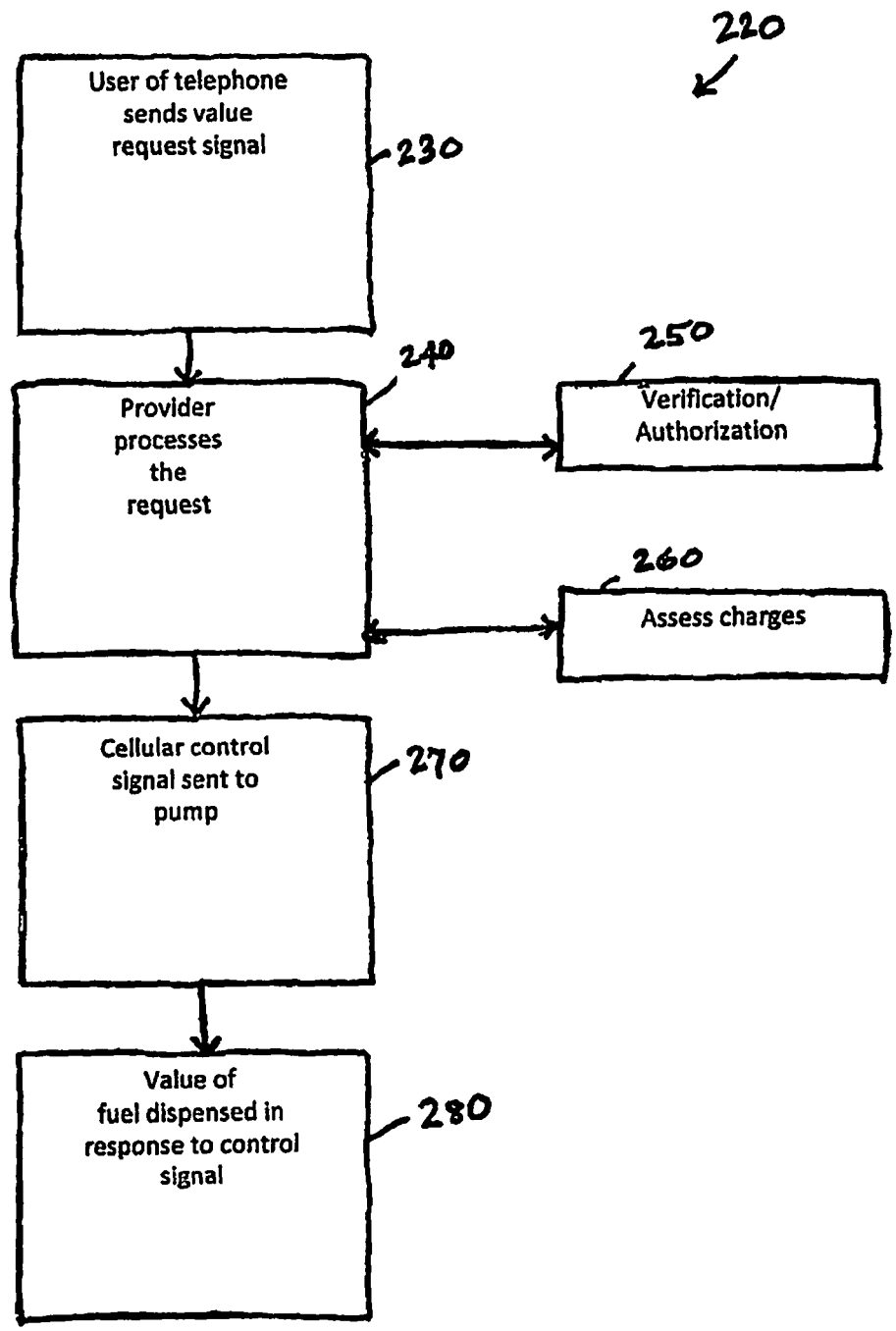
FIG. 8 illustrates a flow diagram of a method associated with sending of a cellular telephone signal to a unique telephone number associated with a dispenser.

Component 24 may be positioned at an external portion of pump 20 or may be included within pump 20 or within a housing of pump 20 as desired. FIGS. 5-7 depict various aspects or arrangements of component 24 and controller 22. It may be appreciated that such arrangements are examples of the type of arrangements that may be used for equipping pump 20 with a feature of having a unique calling number. It may be appreciated that additional arrangements are possible. FIG. 5 shows motherboard or controller 22 positioned within pump 20. It may be appreciated that electrical connections may exist between controller 22 and meter/valve units 52 and displays 54, and other components of a standard fuel pump. It may be appreciated that all of the elements of cellular phone component 24 may be included with the elements of controller 22.

Component 24 may include, for example, cellular signal receiver 32 configured to receive wireless cellular signals. Receiver 32 may also be directly associated with controller 22 as desired. Receiver 32 may include a cellular antennae or the like, and receives a cellular signal, such as a control signal 38, and passes the signal (through an electrical connection) to a cell phone signal interface 34 (see for, example, FIG. 3) which converts the cellular signal to an electrical signal appropriate for feeding or sending to a circuit or circuitry within controller 22 or to other circuitry within vending machine or dispenser 20, 21. The control signal 38 and electrical signal includes or represents data/information used to operate controller 22 or vending machine or dispensers as desired. Interface 34, also referred to herein as a cell pod, may be positioned within controller 22 or within component 24, for example. In an alternative example, cell pod 34 is a separate element that connects to a cellular telephone and to a vending machine as described later. Cell pod or interface 34 may include integrated circuits, software, programmable logic or code or other electrical elements in order to effectively convert cellular signal to electrical signals usable by controller 22. Cell pod or interface 34 may also connect directly to electrical elements of a vending machine or pump, and alternatively may connect to a controller 22 or microcontroller of such machine or pump. Having a controller connected to a motherboard is not required for use of cell pod.

Control signals 38 are cellular signals that are received by receiver 32 and component 24. Control signals 38 may include, for example a text message which includes or represents data/information used to control controller 22. The text message may be encrypted as desired. In one example the control signal 38 represents a pre-authorized value/volume of fuel to be dispensed. The value may be expressed or represented in an amount of currency, in an amount of pre-paid minutes, in an amount of credit or debit, or other amount, and the volume amount may be expressed in various units, for example liters, gallons, etc., which may also represent a monetary value. The value may be expressed in the form of a digital signal, for instance. Controller 22 may be programmed to cause fuel pump 20 to cease pumping fuel upon dispensing the pre-authorized value/volume of fuel. Signal 38 may contain information relating to the pre-authorized value/volume of fuel to accommodate automatic shut-off of pump dispensing.

In one example, control signals 38 are generated and broadcast on a cellular telephone system or cellular network. A cellular network or mobile network is a radio network distributed over land areas called cells, each cell served by at least one fixed-location transceiver, known as a cell site or base station. In a cellular network, each cell uses a different set of frequencies from neighboring cells, to avoid interference and provide bandwidth within each cell. The control signals 38 may be transmitted by or through a cellular phone system provider 40. Provider 40 may be a network of providers or sub-providers and may include a cellular phone company that includes customers as account subscribers. In another aspect a customer might not be an account subscriber but someone who simply purchases a cellular telephone that has a designated phone number and pre-paid minutes or credits. The information pertaining to a particular phone number, i.e., corresponding information such as account status, credits, pre-paid minutes, and other cellular telephone data may be retained in a database or network accessible by cellular phone system provider 40.

Provider 40 may utilize the cellular or mobile network to transmit signals and provide telecommunications. In one aspect, provider 40 may include the cellular or mobile network, together with the equipment, or portions of the equipment, to operate the same. In further aspects provider may subscribe to, contract from, or share with a third party for such equipment. In one aspect a provider 40 may include cellular transceivers, switching equipment and other communication devices used to provide cellular telephone services, and/or provider may subscribe or contract to use the same. Provider 40 may also include, or have access to, or use information from, a computing unit 42. A computing unit 42 may include any variety of computing means and components, and may include a computer or computers, a network, or other computing means. A computing unit 42 and provider 40 may also include a database 44 or databases. Database 44 may store information pertaining to a user telephone, a telephone account, including but not limited to credit items, usage data, pre-paid minutes or credits, debits, location information, and similar information. Computing unit 42 and/or database 44 may be accessible yet physically located at a position remote from provider 40.

Figure 4:
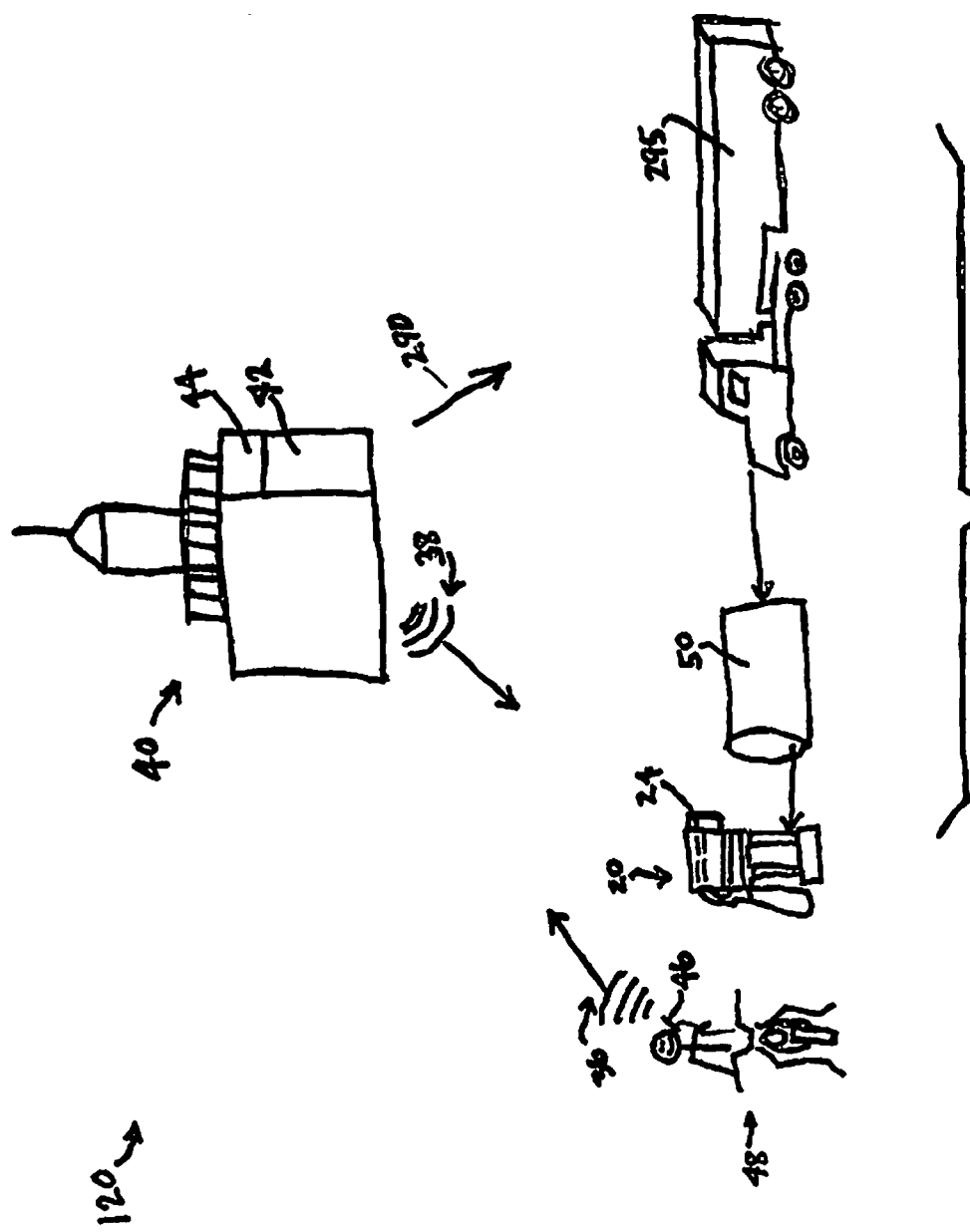
FIG. 4 is a schematic diagram of an exemplary dispenser and exemplary system and method that utilized the dispenser in accordance with an aspect of the present invention.

With reference to FIG. 4, a fuel dispensing system 120 is provided, for example. It may be appreciated that dispensers which dispense other products, such as vending machines or other dispensers 21 may be utilized in the system 120. System 120 includes a provider 40 which receives information representing a requested defined value/volume of fuel, for instance. In one aspect, the information is transmitted to provider 40 via a request signal or request signals 36. Request signal 36 is transmitted by a cellular telephone 46 over the cellular or mobile network (in one aspect transmitted through at least one fixed-location transceiver and through at least one cell). In one aspect a fixed-location transceiver is part of a cellular or mobile telephone network which is utilized by consumers. Provider 40 is configured to authorize the sending of information representing the pre-authorized amount of fuel. The information is sent as a wireless cellular signal, and may include a control signal 38 or signals 38. Provider 40 may send signals 38 itself, or such signals may be authorized by provider 40 to be sent by a sub-provider or third-party.

Prior to sending cellular signal 38, or authorizing the sending of signal 38, provider 40 may verify (or have verified) the requested transaction. Verification may include, for example, comparing data associated with the cellular telephone 46 with account information relating to telephone 46. Such account information may be retained by provider 40 or third party. Such information may include, for example, an amount of pre-paid minutes, credits, debits, payment data and information and other information relating to a cellular telephone 46 or an account related to the telephone 46. When request signals 36 are sent from telephone 46, the unique calling number of telephone 46 is associated with signals 36. Authorization is accomplished in part by authenticating the unique calling number associated with telephone 46 and confirming that payment can be or is made. Authorization may be made through use of computing unit 42 which may or may not reference database 44, for example. A PIN number or security code or other authentication means may also be used in conjunction with the authorization noted herein. When authorization is achieved, a signal, such as control signal 38, representing a pre-authorized amount of fuel to be dispensed, may be transmitted. Signal 38 is received by receiver 32 of cellular phone component 24, for example, and is automatically presented to controller 22 which in turn controls pump 20. In such manner a customer, such as customer 48, or other person using telephone 46 may request dispensing of fuel of a defined value/volume. Such request is represented in one example as a digital cellular signal 36 received by provider 40. Thereafter, upon authorization, the defined value/volume represented as a digital cellular signal 38 is received by pump 20 to dispense the designated fuel. In one example signal 38 is a text message.

In a further aspect, system 120 may include at least an additional fuel pump 20, and in further aspects a plurality of fuel pumps 20 may be utilized. In such aspect, each fuel pump 120 may include a cellular phone component 24 having a unique calling number. The separate cellular phone component 24 is electrically connected to a respective controller 22 of the various pumps 20.

Further method aspects may be seen with reference to FIGS. 1-12. In reference to FIG. 8, one method 220 includes facilitating the purchase of fuel (or other goods) by a user 48 of a cellular telephone 46. Step 230 includes a user 48 initiating a purchase request, for instance by using a cellular telephone, of a defined value/volume of fuel or of an identified item. The request may include a pump number or other designation associated with the particular pump or dispenser from which fuel or items will be dispensed. The request is transmitted as request signal 36. The signal may be a text message or other electronic message. At step 240 provider 40 processes the request. In one instance provider 40 may receive the request and then process the request, in other instances provider may receive the request from a sub-provider or third party. For example, the request may be received by a cellular signal receiver which in turn forwards the request to provider 40. Provider 40 or sub-provider or third party may undertake step 250 verification or authorization of the request. At such step 250 a pin or other authorization means may be used to compare with data previously stored.

Step 260 includes assessing a charge to the cellular telephone 46 (or to an account associated with the telephone 46, or with a user associated with such telephone or account). Assessing a charge 260 may include billing a user account associated with the cellular telephone (or the unique calling number of the telephone). Assessing a charge 260 may also include debiting pre-paid minutes associated with the cellular telephone or associated with an account related to the cellular telephone and/or unique calling number. Assessing a charge 260 may also include reducing credits or billing an account or other techniques of assessing a charge or receiving payment. In one instance the amount charged at step 260 is in an amount greater than the value/volume of fuel (or other item to be dispensed, such as an enhanced charge. In this way a services fee or additional revenue is received by provider 40 (or by sub-provider and/or third party) for the service of facilitating the purchase of fuel or other items. A portion of the enhanced charge may be shared between a cellular telephone service provider associated with the cellular telephone 46, for instance, and a cellular telephone service provider associated with the unique telephone number associated with the pump 20 or dispenser.

Step 270 includes a cellular control signal 38 sent to dispenser pump 20. Signal 38 may be sent by provider 40 and/or sub-provider and/or a third party. In one example signal 38 is an encrypted text message. Signal 38 may be of other variety of wireless signal. Signal 38 may be received by cellular phone component 24. Step 280 includes dispensing fuel of the defined value in response to receiving control signal 38. In one example the control signal 38 automatically controls pump 20 in order to dispense fuel (upon a user grasping a handle of a hose nozzle) and to automatically shut-off dispensing of fuel.

It may be appreciated that system 120 may include multiple pumps 20 where each pump 20 or dispenser includes a unique calling number as noted herein. Multiple pumps 20 or dispensers may dispense different types of fuel or items and may also charge different prices for the same fuels or for different fuels or items. It is not uncommon for the price of fuel to change frequently. One aspect of system 120 allows for convenient purchase or sale of fuel regardless of the type of fuel or the price associated with the fuel in any given pump 20. Such system may also avoid use of complicated means such as computers and databases used to keep track of which of the numerous pumps 20 contain a particular fuel or have a particular price of fuel. Instead, an in one example, the purchase of fuel is based on the value of minutes associated with the control signal 38. In such case a cell phone company or provider 40 need not know the price or type of fuel that is being dispensed at any particular pump 20 (and thus the cell phone company or provider 40 does not have to track such data). Instead the cell phone company or provider 40 simply tracks the debited minutes associated with cellular telephone 46.

It may be appreciated that a user 48 may obtain relatively cheap or inexpensive minutes that are then used to purchase fuel. In some cases where a user can obtain inexpensive minutes, the user can dispense fuel for a relatively lower cost. A user 48 may also accumulate minutes for fuel purchases. It may be appreciated that a pump owner or station proprietor may adjust prices independently and at various times. The pump 20 and system 120 accommodate such flexibility and may do so without any special database or tracking. A proprietor may display a value of fuel at pump 20 by associating a particular amount of telephone minutes. In one example a certain or defined amount of minutes may result in dispensing a certain or defined amount of fuel or other item.

While a value associated with signals may be expressed in terms of telephone minutes, in other aspects values may be expressed in terms of currency, price, volume or other criteria.

Step 290, as generally represented by the arrow 290 in FIG. 4, includes paying a supplier associated with the fuel or other items to be dispensed an amount corresponding to the value of fuel or item to be dispensed. Alternative to paying a supplier is reducing a credit of the supplier. It may be appreciated that the step of assessing a charge occurs prior to step 270 where a cellular control signal is sent to dispenser pump 20. In such case the value of fuel or item to be dispensed is already paid even if the dispensing should fail. A step or mechanism may be utilized for resolving failed fueling and/or crediting of an account or reversing assessment 260 as needed. In further aspects more than one pump 20 may be configured with a cellular phone component 24 and unique calling number to accommodate fueling at multiple pumps and to further facilitate the purchase of fuel. As shown in FIG. 4 a fuel company represented as a fuel supplier 295 may include a truck that delivers the fuel to a tank 50. Tank 50 may be an above-ground tank 50 or may be positioned below ground or at other location.

In operation a user 48 may enter a telephone number corresponding to system 120 and transmit the request signals to the designated telephone number. In addition or alternatively, user 48 may also use a telephone computer application program which facilitates communication with system 120. A phone application software component may assist user with the input of information that is transmitted to provider 40. Information may be wirelessly transmitted to provider 40 by user 48 to initiate fueling. Cellular telephone 46 may be pre-programmed with user preferences, codes, security, telephone numbers, etc., in order to streamline and secure a request or fuel purchase. A dispenser or pump identification number may be included in the request signal.

Dispenser and fuel pump 20 and system 120 work well, for example, in areas where electricity is scarce or unavailable, and also allow for a pumping solution and payment system that avoids the expensive and complicated controls of traditional systems. Pump 20 need not be equipped with expensive devices such as card readers/scanners or computers (or even connected/wired to a local computer or pump controller). Instead, an inexpensive cellular telephone component (or cellular telephone) is connected to a standard pump and configured to operate pump 20 as described herein. Pump 20 may also be associated with a battery powered fuel system or system that runs on solar or alternative power (and also with above-ground and portable tanks) so that pump and tank 50 may be positioned in remote areas and/or in areas where traditional fueling stations cannot.

In further aspects the assessment step 260 may instead comprise authorizing the assessment of charges where a third-party undertakes the actual assessment and tracking of the charges. In one aspect the step includes authorizing the debiting of minutes from a pre-paid account. In one aspect the debiting occurs in an amount corresponding to the value of fuel associated with the cellular telephone signal request. In a further aspect the debiting minutes from the pre-paid account or charging an account is in an amount that is greater than the value of fuel represented in the wireless cellular telephone signal sent to the fuel pump. The amount debited may represent an amount greater than the value corresponding to the value/volume of fuel actually dispensed. In further aspect the payment step 290 to a fuel company (such as a fuel supplier, distributor, transporter, middle-man, refiner, broker, or other type of fuel-related business) comprises payment to the fuel company in an amount corresponding to the value/volume of fuel dispensed. In a further aspect the payment step 290 to a fuel company comprises an amount less than the amount corresponding to the value of fuel dispensed.

In a further aspect, a standard dispenser or fuel pump may be retrofitted with cellular phone component 24. In such case the previous dispenser or pump will then operate as pump 20, capable of receiving a cellular control signal 38 to control dispensing of fuel or other item. In such case the standard dispenser or pump is allowed to operate to process payments as it normally does while also having the payment facilitation and convenience as described herein. In such case an operator or owner of the pump or related station may also realize a benefit when avoiding and/or reducing service charges associated with a credit card or debit card transactions.

Figure 9:
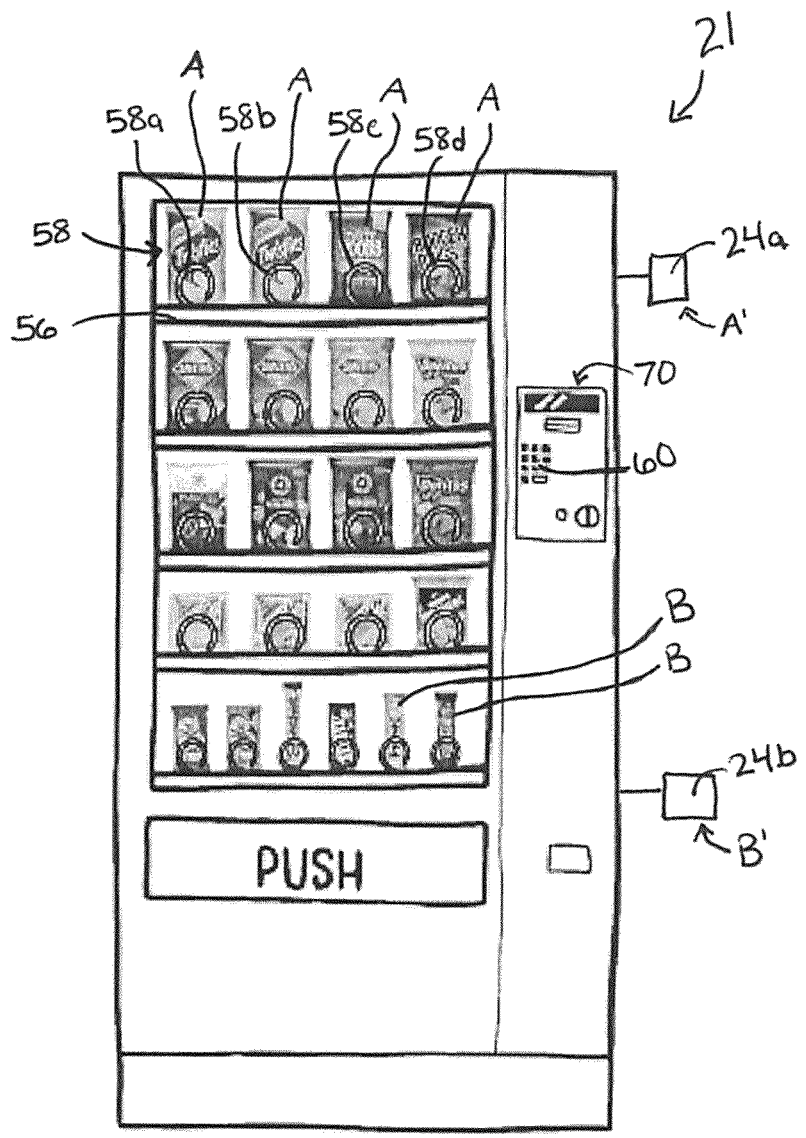
FIG. 9 an elevation view of an exemplary dispenser in accordance with an aspect of the present invention.

In a further aspect a dispenser 21 (see for example, FIG. 9) may be associated with one or more unique calling numbers. Some dispensers are configured to dispense a single product or item (such as fuel) while other dispensers are configured to dispense different varieties of items. A snack vending machine, for instance, may dispense several varieties of candy bars, chips, snacks, gum, breath mints, etc. A soda or beverage dispensing machine, for instance, may dispense several varieties or brands of soda, soft drinks, waters, or different beverages. In many instances there are price differences between or among the varieties of vending items. Other characteristics of the items in addition to a price characteristic may be volume, weight, size, color or other data used to distinguish goods or services. A bag of chips may have price A while a candy bar may have price B. Different items may be grouped according to price. To accommodate such differences, dispenser 21 may be equipped with a phone component or components 24 where each individual phone component has an associated unique calling number. In one example, controller 22 may be equipped with component 24*a*, 24*b* (or even additional components 24). Components 24*a*, 24*b* may be contained within dispenser 21. As shown in FIG. 9, components 24*a*, 24*b* are alternatively positioned external to dispenser 21. Component 24*a* may have an associated cellular telephone number A' (which may include, but is not limited to, a 10 digit telephone calling number), and component 24*b* may have an associated cellular telephone number B' (which may include, but is not limited to, a 10 digit telephone calling number). Dispenser 21 may be further configured such that a control signal 38 may be transmitted in association with telephone number A' which in turn is configured to control dispensing of an item or one from a group of items having price A. Dispenser 21 may be further configured such that control signal 38 may be transmitted in association with telephone number B' which in turn is configured to control dispensing of an item or one of a group of items having price B. In this way dispenser 21 may include a variety of different items having a variety of different prices. Dispenser may be equipped with several different telephone number associations so that each product (or group of products) to be dispensed can be controlled by separate telephone numbers associated with control signals 38.

In one example, a dispenser may include a candy bar item (or row of candy bar items) and a bag of chips (or row of bags of chips). A phone component 24 may be configured in association with a unique calling telephone number A' which is in turn associated with bag of chips item A (having price A). A phone component 24 may be configured in association with a unique calling telephone number B' which is in turn associated with a candy bar item B (having price B). A user may select which vending item by utilizing the steps noted above and select a particular item (for example, by including a sub-code in the request signal 36, or by selecting the item on a software application associated with cellular telephone 46, or by other means). Upon submitting request signal 36, provider 40 sends corresponding signal 38 which is associated with the selected item. Controller receives the signal and activates dispensing of the particular item.

Dispenser 21 may be equipped with a unique telephone number for each vending product. The dispenser 21 may be configured so that a telephone number corresponds to a single row or coil dispenser which rotates to allow the selected item to drop to a dispenser tray. FIG. 9, for instance, includes a row of chip items A positioned on a shelf 56. A coil 58 is provided where a bag of chips is positioned within coil 58. A string of chip items A may be positioned within a length of coil 58. When coil 58 rotates, chip item A travels outward and falls off shelf 56. Chip item A lands at a portion where a user may retrieve the item by pushing on the PUSH access to grasp the item A as is understood. Each coil 58 of dispenser may be associated with a unique calling number. Alternatively, a group of coils 58*a*, 58*b*, 58*c*, and 58*d*, for example, may be associated with a unique calling number. A dispenser may have numerous calling numbers. Calling numbers may also be arranged so that one of a group of similarly priced products may be purchased by using a unique telephone number while one of a different group of similarly priced products may be purchased by using another unique telephone number. The groupings of items may be grouped according to rows of items (i.e., all items A on a particular shelf level 56 may be priced at the same amount as compared to items positioned at a different area, section, coil or shelf). The telephone numbers may be associated with SIM cards. In one example the SIM cards may be utilized in conjunction with a controller 22, controllers, or micro-controllers. Multiple controllers 22 may also be used in conjunction with dispenser 21. It may be appreciated that a variety of control elements may be used in a vending machine which communicate with a cell pod 34 configured to communicate a purchase request signal to operate dispensing.

Figure 10:
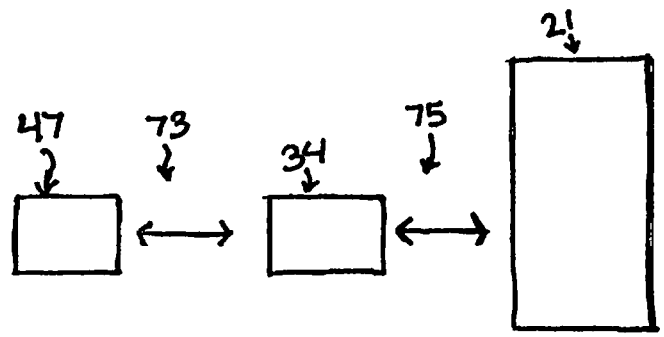
FIG. 10 is a schematic view of an aspect of the present invention.
Figure 11:
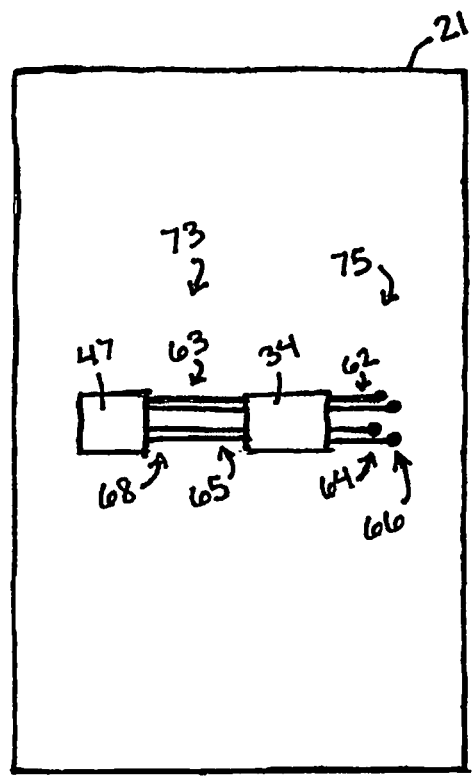
FIG. 11 is a schematic view of a further aspect of the present invention.
Figure 12:
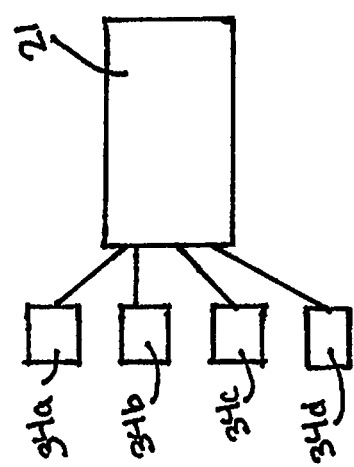
FIG. 12 is a schematic view of a further aspect of the present invention.

Referring to FIG. 10 and FIG. 11, an off-the shelf cellular telephone 47 may be configured to communicate with cell pod 34 which in turn communicates with a dispenser, and vice versa. In one aspect dispenser may be a vending machine dispenser 21 or alternatively a dispenser having a pump such as dispenser 20. Cell pod 34 allows a vending machine 21 to be configured to receive a cellular signal such as a text message for dispensing a product. Cell pod 34 enables a simple cellular telephone 47 to communicate and control a vending machine 20, 21. Vending machine 21 may be a standard vending machine that is retrofitted with cell pod 34 and telephone 47. Alternative to being of a standard variety, vending machine 21 can also be specially equipped with control systems and circuitry that include the functions of cellular telephone 47 and cell pod 34. Cell pod 34 and telephone 47 may be positioned within dispenser 21. Alternatively cell pod 34 and telephone 47 may be positioned external dispenser 21.

In one aspect, cell pod 34 is configured to draw electrical power from dispenser 21 and supply the electrical power to telephone 47. In one instance cell pod 34 may include two power wires 62 or terminals that connect with two power wires or terminals within dispenser 21. Power wires 63 may also be connected between telephone 47 and cell pod 34. When telephone 47 is connected to cell pod 34, telephone 47 will be recharged or powered for ready operation. A battery may or may not be included with telephone 47. In further aspects, telephone 47 may be a standard off-the-shelf type of cellular telephone that contains ordinary features such as a speaker, microphone, buttons or touch screen, receiver, battery, SIM card port and SIM card, and related circuitry and other items common to an off-the shelf cellular telephone. It may be appreciated that not all of these features are necessary for use in conjunction with dispenser 21. For instance, buttons or touch screen for manual input of data may not be necessary for normal operation since telephone 47 may be contained within dispenser 21 and configured to automatically send information. Programming or instructions within cell pod 34 may allow automatic sending of information. Alternatively buttons or touch screen may be included. Other features such as a speaker or microphone may be optionally removed or excluded. It may be appreciated that telephone 47 may be a cellphone component such as component 24.

Cell pod 34 is configured to pass and receive communication signals to and from dispenser 21 and receive and supply communication signals from telephone 47. Cell pod 34 includes vending machine connecting means 75. In one instance connecting means 75 may include two communication wires 64 or terminals that connect with two communication wires or terminals within dispenser 21. Cell pod 34 also includes cellular telephone connecting means 73. In one instance, cellular telephone connecting means 73 may include communication wires 65 which connect with communication wires or terminals of cellular telephone 47.

As an alternative to wires, vending machine connecting means 75 may include a plug (or plugs) that is configured to connect with terminals, ports or other connectors of dispenser 21, and cellular telephone connecting means 73 may include a plug (or plugs) configured to connect with terminals, ports or other connectors of telephone 47. In alternatives for connecting means 73, 75, a wireless communication may be established between cell pod 34 and telephone 47 and between cell pod 34 and dispenser 21. In one instance connecting means may include an adapter (or adapters) to connect telephone 47 to cell pod 34 and to connect cell pod 34 to dispenser 21. In one example cell pod 34 may be connected to a controller 22 of a dispenser 21. In one instance telephone 47 includes a port, such as a serial port (for instance, a S-pin serial port), configured to accommodate connection of telephone 47 to cell pod 34. Cellular telephone connection means 73 may include a serial port connector configured to connect to a serial port of telephone 47. Communication signals, such as text message signals, may pass through serial port connection.

Electrical power may also be passed as appropriate and as discussed in part above. In one instance cellular telephone connecting means 73 includes power wires 63 and vending machine connecting means includes power wires 62. Connecting means 73, 75 may include a plug or plugs configured to connect with terminals, ports or other connectors of telephone 73 and vending machine 21 in order to pass electrical power from vending machine 21 to telephone 73. In one aspect a plug or plugs may be configured to pass both electrical power and communication signals.

In one aspect an adapter may be configured to connect to the serial port of telephone 47. In some telephone models, a SIM card will cover or partially cover the serial port. The adapter may include a male plug (or female plug as needed) to connect to the serial port while simultaneously allowing a SIM card to be plugged into a SIM card holder of the telephone. A battery, which may also cover the serial port in some designs, is also an alternative feature in the event electrical power is received from the dispenser or a component of the dispenser. In some instances a standard cellular telephone power cord may be used to plug into a power supply within dispenser 21. A serial port of the telephone may also be positioned such that a standard serial port connector may be connected to the serial port without interference with other components of the telephone Referring to FIG. 12, dispenser 21 includes multiple cell pods 34. Cell pods 34 are positioned within dispenser 21. Alternatively cell pods 34 may be located external to dispenser 21. In one example each cell pod 34 is associated with a unique cellular telephone number and is capable of receiving a cellular signal, such as a text message. In one aspect each cell pod 34 is equipped with a cellular telephone 47 or cell phone component 24. Each cell pod 34 having a unique cellular telephone number may be configured to operate dispensing of a different item from dispenser 21. Cell pod 34, for instance, may be configured to send a signal to dispenser 21 to dispense a bag of chips item A, while cell pod 34d, for instance, may be configured to send a signal to dispenser 21 to dispense a candy bar B. Item A and item B may be different items and are not limited to those shown. A control signal 38 or signals 38 may be received by cell pods 34 to distribute a requested item. Signal 38 is sent in response to a request signal 36 from a consumer.

As discussed, cell pod 34 interfaces between dispenser 21 and cellular telephone 47. In one aspect, within cell pod 34 is a chip containing a program used to transform a received cellular signal. Such cellular signal is a text message, for instance. In one instance the text message will be sent to the display on the cellular telephone 47. The text data is captured by cell pod 34. In one alternative the text message need not be displayed at the telephone 47, but the text message is to be received by cell pod 34. The program within cell pod 34 converts the text message into a signal that may be used by dispenser 21. In one instance the program adjusts or modifies the text message from one language (whether the language is a natural language such as English or Chinese, or whether the language is a computer language or a machine language) into a different language that is recognized by dispenser 21. For instance a text message may be received by telephone 47 that is based on an English language and standard numbers while dispenser 21 was configured to receive a signal to activate a coil 58. Cell pod 34 modifies the text message into a signal recognized by dispenser 21 (such as recognized, for instance, by a controller 22 or microcontroller or other component) in order to acrivate dispensing. In such example the activation occurs even if dispenser 21 (and associated controllers 22 or microcontrollers or other components) were configured to receive a signal based on Chinese or based on some other natural language, signal or computer language. The translation of the text message signal to operational signal may be accomplished by the programming in cell pod 34. In one instance the modified message is passed to a controller or micro-controller which receives the message and carries out the requested operation. Cell pod 34 may be pre-programmed to interface with a particular dispenser 21. A new or different cell pod 34 may be used for each type of dispenser 21 depending on the signal requirements needed to activate or operate dispenser. Since the software protocol for cellular telephones may be an international standard, cell pod 34 may be configured to work with such standard protocol or other protocols. Multiple cell pods 34 may be used within a single dispenser 21. Multiple SIM cards may be used within a single dispenser.

In a further aspect, cell pod 34 may include a card or other storage media that stores a program used to modify the received text message into a useable signal that is passed to dispenser 21. The card or other media may be loaded with a program that translates the incoming text message signal into a particular control signal useable with a particular dispenser. A different program may be loaded on the card or other media so that the card or media may be compatible for use with a different dispenser. A variety of cards or other media may include pre-loaded programs to be used with a respective dispenser 21. A user may then modify cell pod 34 to work with a variety of types of dispensers 21 by replacing one card or other media with another card or media. Alternatively, a variety of cell pods 34 may be configured to work with a variety of dispensers. A user may use one type of cell pod 34 (i.e., equipped with a first program) to work with one type of dispenser 34 and another type of cell pod 34 (i.e., equipped with a different or second program) to work with a different type of dispenser 34. In this manner a user may select from a variety of cell pods 34 depending on which particular dispenser 21 is to be configured. Different types of cell pods 34 (i.e., having different programming) may also be used to accommodate interfacing with a variety of different cellular telephones 47. In one example a single unique telephone number is associated with a single cell pod 34 contained within dispenser 21. Having the ability to program cell pods 34 (or interchange pre-programmed cell pods 34 or insert cards) to work with a variety of dispensers 21 allows for ease in configuring system 120.

In operation of one aspect of the invention a user will use his or her cellular telephone 46 to generate a request signal 36 that corresponds to dispensing an item or product, such as dispensing fuel or vending items. The signal is sent via a cellular telephone network, typically as a text message. The signal is received, for example, by a provider 40. The provider 40, or an agent or contractor of provider 40 will produce a control signal 38, such as a text message. Control signal 38 is received by dispenser 20, 21 which activates a dispensing action. In one instance, control signal 38, such as a text message, is received by telephone 47 (or by a cell phone component 24) which in turn is transformed by cell pod 34 into an operation signal 66 compatible with dispenser 20, 21. In one instance the operation signal 66 travels via vending machine connecting means 75. In one instance the operation signal 66 is passed to a controller or microcontroller or other circuitry of dispenser 20, 21. The operation signal 66 turns on or activates dispenser 20, 21. In a further aspect dispenser 20, 21 generates, or cell pod 34 generates or receives, a confirmation signal 68 which is sent to telephone 47. Confirmation signal 68 may be an encrypted text message, for example, that is sent through cellular network to provider 40. A reply signal, such as a text message may be sent to the user at telephone 46. A billing operation may occur at provider 40 where the user is charged for the purchase. The purchase may be made by debiting pre-paid cellular telephone minutes or other value. An off-the shelf cellular telephone may be used for telephone 47. Cell pod 34 accommodates use of an off-the-shelf telephone in conjunction with a variety of different dispensers 20, 21, which dispenser may also be off-the-shelf. Cell pod 34 may be integrated with telephone 47 (or component 24) and retrofitted to a standard dispenser, 20, 21. Multiple cell pods 34 may be associated with a single dispenser 20, 21. Use of cellular technology and text messaging in conjunction with standard telephones and dispensers allows for a low cost and efficient dispensing system. Cell pod 34 allows for assuring compatibility with a variety of types of telephones and dispensers. Cell pod 34, or circuitry and programming of cell pod 34 (and telephone 47, or component 24) may be integrated with the electrical operation elements of a dispenser 20, 21. Alternatively, cell pod 34 and telephone 47 may be retro-fitted with dispenser 20, 21. A different cell pod 34 may be designed for each different type of dispenser 20, 21. A chip used as a translator may plug into cell pod 34 to adjust the settings and operation of cell pod 34 as desired.

In a further aspect dispenser 21 may be associated with multiple telephone calling numbers where dispenser 21 receives a signal 38 which results in a credit state at the dispenser 21. For instance, when signal 38 is received by dispenser 21, a display 70 of the amount of currency (or other value) is presented at dispenser. A user may then select (for example by pushing a button 60 on dispenser 21) any one of several items which correspond to the currency value of the credit. One item from a group of similarly priced products may be purchased with a signal 38 associated with a first telephone number while an item from a different group of similarly priced products may be purchased with a signal 38 associated with a second telephone number. Multiple SIM cards may be included with dispenser 21. Telephone component may also be configured without a SIM card slot where the telephone functions are included or hard-wired within the controller mechanism. The circuitry of the telephone component 24 may also be configured to plug into controller 22.

Upon receipt of a signal associated with a unique telephone number, dispenser 21 dispenses an item associated with the telephone number. In one example dispenser 21 is configured to dispense a variety of different items where the items are associated with different telephone numbers. In one example the signals are encrypted. In one example the signals are text message signals. The signals received by the dispenser 20, 21 may include information pertaining to the item to be dispensed, and additional information relating to the purchase, the customer, special offers, coupons, advertisements, commands, warnings, instructions, account information or other information.

Further aspects include a method of facilitating the purchase of fuel or items by a user of a cellular telephone 46 where fuel or items are dispensed from a dispenser 20, 21 in response to a cellular telephone signal request 36 associated with the cellular telephone 46. The method of facilitating includes assessing a charge to the cellular telephone in an amount representing a value of the fuel or item to be dispensed, and authorizing the sending of a cellular telephone signal 38 to a unique telephone number A' associated with the dispenser 20, 21, the telephone signal 38 representing a value or volume of fuel or item to be dispensed.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular CELLULAR VENDING APPARATUS SYSTEMS AND METHODS as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. A vending apparatus comprising:
   a controller positioned within said vending apparatus and configured to control dispensing of items or fuel from said apparatus; and
   a cellular phone component positioned on or within said vending apparatus and electrically connected to said controller and configured to receive a control signal in the form of a wireless cellular telephone signal pertaining to a value or volume of items or fuel to be dispensed authorized by a cellular telephone provider where the signal relates to a value charged to a cellular telephone account of a cellular telephone provider or charged to a user's telephone having pre-paid minutes or credits and where the control signal is received in response to a request generated by a user to a cellular telephone provider, said phone component comprising a SIM card.

2. The vending apparatus of claim 1 where said cellular phone component further comprises a cellular signal receiver and a cell phone interface configured to convert cellular telephone electrical text message signals into dispenser electrical signals.

3. The vending apparatus of claim 1 where said cellular phone component is configured to receive an encrypted text message, said controller configured to cause said vending apparatus to dispense fuel or items upon receipt of the text message, the text message represents a pre-authorized value or volume of fuel or item, said controller configured to cause said vending apparatus to cease pumping fuel or dispensing items upon dispensing the pre-authorized amount of fuel or item.

4. The vending apparatus of claim 1 where the cellular phone component is configured to receive the control signal from a first cellular telephone provider, the first cellular telephone provider being the same as the cellular telephone provider which receives the signal from the user and the same as the cellular telephone provider having the cellular telephone account.

5. The vending apparatus of claim 1 where the cellular phone component is configured to receive the control signal from a first cellular telephone provider, the first cellular telephone provider being different than the cellular telephone provider to which the user generates the request.

6. The vending apparatus of claim 1 where the value charged is associated with an amount of cellular telephone minutes associated with the cellular telephone account.

7. The vending apparatus of claim 1 where the value charged is associated with one from the group of minutes, pre-paid minutes, credits, debits, account billing, telephone bill charges, currency, dispensable volume, price.

8. The vending apparatus of claim 1 where the signal relates to an item or amount of fuel to be dispensed and corresponds to the value charged to a cellular telephone account or to a user's phone number having pre-paid minutes or credits.

9. The vending apparatus of claim 1 where the signal is received in response to a text message originated and sent by the user directly to the cellular telephone provider.

10. The vending apparatus of claim 1 where the signal is received in response to a request signal generated by a software application used by the user.

11. The vending apparatus of claim 1 where said controller is configured to operate only when said phone component receives a text signal from the cellular telephone provider and configured to dispense an item or fuel only in response to said phone component receiving the text signal.

12. The vending apparatus of claim 11 where said controller also operates by receiving hard currency.

13. The vending apparatus of claim 1 where said vending apparatus includes a non-displayed unique calling number.

14. The vending apparatus of claim 13 where said vending apparatus includes a second non-displayed unique calling number.

15. A vending system comprising:
   a cellular phone system provider configured to receive a message generated from a user containing information representing a requested item or fuel to be dispensed, and configured to authorize a value or volume of items or fuel to be dispensed and to send a wireless cellular control signal pertaining to the item or amount of fuel to be dispensed; and a vending apparatus comprising:
- a controller positioned within said vending apparatus and configured to control dispensing of items or fuel from said apparatus; and
- a cellular phone component positioned on or within said vending apparatus and electrically connected to said controller and configured to receive the control signal in the form of a wireless cellular telephone signal from a cellular phone system provider where the control signal relates to a value charged to a cellular telephone account of a cellular telephone system provider or charged to a user's phone having pre-paid minutes or credits and where the control signal relates to a value of the item or fuel to be dispensed, and where the control signal is received in response to a request generated from the user to the cellular telephone system provider, said phone component comprising a SIM card.

16. The vending system of claim 15 where said cellular phone system provider is configured to receive the message from a user as a text message sent from the user directly to said cellular phone system provider.

17. The vending system of claim 15 where the control signal is a text signal.

18. The vending system of claim 15 where the signal from said cellular phone system provider relates to a value pertaining to a cellular telephone account of said cellular telephone system provider.

19. A method of dispensing a requested item or fuel, said method comprising:
- receiving a message at a cellular phone provider, the message having been sent by a user and containing information representing the requested item or fuel to be dispensed;
- assessing a charge to a user account of a cellular telephone provider or to a user's telephone having pre-paid minutes or credits, said assessing a charge in an amount representing a value of the item or fuel to be dispensed; and
- authorizing, by a cellular telephone provider, the value or volume of item or fuel to be dispensed and the sending to a vending apparatus a control message in the form of a wireless cellular telephone signal from a cellular phone provider, the vending apparatus configured to dispense the requested item or fuel upon receipt of the signal.

20. The method of claim 19 where the message received at the cellular phone provider is sent directly from the user to the cellular phone provider.

21. The method of claim 19 where the control message is a text signal.

22. The method of claim 19 further comprising the step of dispensing the requested item or fuel from the vending apparatus.

23. The method of claim 19 where the cellular telephone provider having the cellular telephone account is the same as the cellular telephone provider which sends the control message to the vending apparatus.

24. The method of claim 19 where the cellular telephone provider having the cellular telephone account is the same as the cellular telephone provider which receives the message sent by the user.

25. The method of claim 19 further comprising dispensing items or fuel from the vending apparatus while avoiding use of a computer server.

26. The method of claim 19 further comprising dispensing items or fuel from the vending apparatus where the cellular telephone provider which authorizes the value or volume to be dispensed avoids tracking of a price or an amount of the items or of the fuel at the vending apparatus.

27. The method of claim 19 further comprising dispensing items or fuel from the vending apparatus where the cellular telephone provider avoids tracking of an amount of the items or of the fuel at the vending apparatus.

28. The method of claim 19 further comprising the step of receiving the control signal at the vending apparatus to dispense the requested item or fuel.

* * * * *